(12) United States Patent
Kimura

(10) Patent No.: US 8,134,729 B2
(45) Date of Patent: Mar. 13, 2012

(54) IMAGE TRANSFER SYSTEM AND IMAGE FORMING APPARATUS

(75) Inventor: Shinichi Kimura, Osaka (JP)

(73) Assignee: Kyocera Mita Corporation (JP)

( * ) Notice: Subject to any disclaimer, the term of this patent is extended or adjusted under 35 U.S.C. 154(b) by 950 days.

(21) Appl. No.: 12/134,632

(22) Filed: Jun. 6, 2008

(65) Prior Publication Data

US 2008/0309992 A1 Dec. 18, 2008

(30) Foreign Application Priority Data

Jun. 15, 2007 (JP) .................. 2007-159160

(51) Int. Cl.
*G06F 3/12* (2006.01)
*G06F 3/00* (2006.01)
*H04L 9/32* (2006.01)

(52) U.S. Cl. ...... 358/1.15; 358/1.13; 719/324; 718/105; 713/176

(58) Field of Classification Search .............. 358/1.15, 358/1.13; 719/324, 327; 718/104, 105; 713/176
See application file for complete search history.

(56) References Cited

U.S. PATENT DOCUMENTS

2007/0061583 A1* 3/2007 Kanatsu et al. ............... 713/176

FOREIGN PATENT DOCUMENTS

| JP | 8-149298 | 6/1996 |
| JP | 2003-283848 | 10/2003 |
| JP | 2004-297758 | 10/2004 |

* cited by examiner

*Primary Examiner* — Thomas Lett
(74) *Attorney, Agent, or Firm* — Gerald E. Hespos; Michael J. Porco

(57) ABSTRACT

An image transfer system has an extracting section that extracts image areas from a document image read by a reading section. A digital signature providing section provides sender's digital signatures to the image areas according to degrees of secrecy. An image file creating section creates an image file including image areas with the sender's digital signatures provided by the digital signature providing section and a sending section sends the image file to a receiving section. A digital signature acquiring section acquires receiver's digital signatures for restricting image areas to be presented to a user. An image area selecting section selects image areas to be presented to the user in accordance with the sender's digital signatures in the image file received by the receiving section and the receiver's digital signatures acquired by the digital signature acquiring section. An output section outputs image areas selected by the image area selecting section.

14 Claims, 12 Drawing Sheets

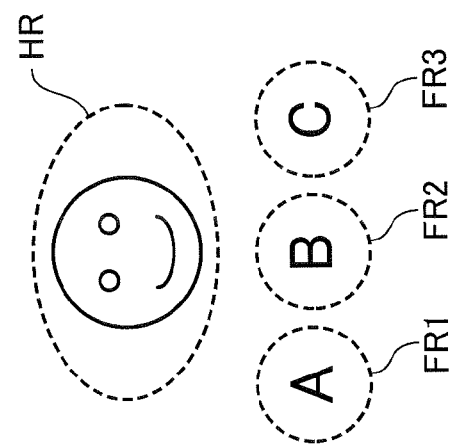
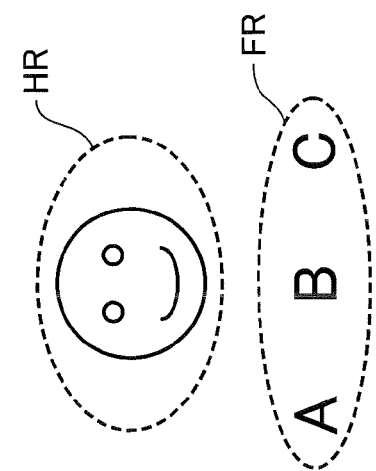
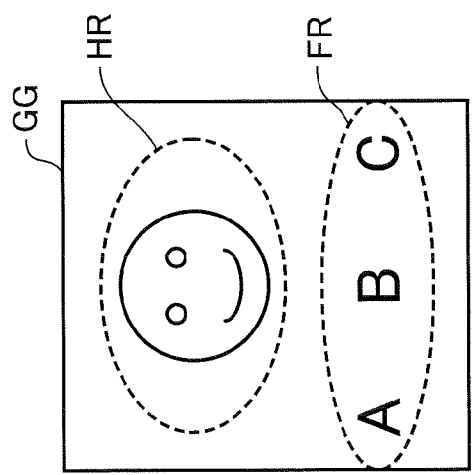

IMAGE TRANSFER SYSTEM AND IMAGE FORMING APPARATUS

BACKGROUND OF THE INVENTION

1. Field of the Invention

The present invention relates to an image transfer system including an image forming apparatus for forming an image and an external equipment communicably connected to the image forming apparatus, and the image forming apparatus for forming an image.

2. Description of the Related Art

Complex machines which are currently available in the market have various functions including a security function. The security function is a function for restricting a document reading operation and an outputting operation in accordance with a user who uses the complex machine. A document to be read may include information which is open to any person and information which should be read only by a certain person in a mixed manner. For example, Japanese Patent Unexamined Publication No. 2004-297758 (hereinafter, referred to as "conventional technology") discloses an image processing apparatus. In the image processing apparatus, a color document including a secret part described in a specified color is read, and then a user authentication is performed. If the authentication is not completed, the specified color part of the read image data is erased so that an output of the specified color is aborted. Then, the image data from which the specified color part is erased is printed on a recording sheet.

Further, in the image processing apparatus according to the above-described conventional technology, the color image data is received and stored, and an addressee permitted to receive the specified color part of the received color image data is stored. If the addressee of the received color image data is not stored, the specified color part of the received color image data is extracted, and then transmission of the extracted specified color part is aborted.

As described above, according to the conventional technology described above, the specified color part is erased at a time of printing and transmitting data. Accordingly, inadvertent copying, printing, or facsimile transmission of a secret part of a document can be prevented.

However, according to the conventional technology, since color image data is sent after a specified color part is erased, it is necessary to transmit the color image data again if the person who receives the color image data will be allowed to refer to the secret part. Therefore, a convenience for a user was impaired.

SUMMARY OF THE INVENTION

The present invention was made to solve the above-described problems, and its object is to provide an image transfer system and image forming apparatus capable of improving a convenience for a user while maintaining a sufficient security.

An image transfer system in accordance with an aspect of the present invention includes: an image forming apparatus for forming an image; and an external equipment communicably connected to the image forming apparatus. The image forming apparatus includes: a document reading section for reading a document; an area extracting section for separating and extracting a plurality of image areas from a document image read by the document reading section; a digital signature providing section for providing sender's digital signatures respectively to the image areas extracted by the area extracting section in accordance with degrees of secrecy of the image areas; an image file creating section for creating an image file including a plurality of image areas provided with the sender's digital signatures by the digital signature providing section; and a sending section for sending the image file created by the image file creating section. The external equipment includes: a receiving section for receiving the image file sent by the sending section; a digital signature acquiring section for acquiring receiver's digital signatures for restricting image areas to be presented to a user from among the plurality of image areas; an image area selecting section for selecting image areas to be presented to the user from among the plurality of image areas in accordance with the sender's digital signatures provided respectively to the plurality of image areas included in the image file received by the receiving section and the receiver's digital signatures acquired by the digital signature acquiring section; and an output section for outputting image areas selected by the image area selecting section.

An image forming apparatus in accordance with another aspect of the present invention includes: a document reading section for reading a document; an area extracting section for separating and extracting a plurality of image areas from a document image read by the document reading section; a digital signature providing section for providing a sender's digital signatures to each of the image areas extracted by the area extracting section in accordance with respective degree of secrecy of the image areas; an image file creating section for creating an image file including a plurality of image areas provided with the sender's digital signature by the digital signature providing section; a sending section for sending the image file created by the image file creating section; a receiving section for receiving the image file sent by the sending section; a digital signature acquiring section for acquiring receiver's digital signatures for restricting image areas to be presented to a user from among the plurality of image areas; an image area selecting section for selecting image areas to be presented to the user from among the plurality of image areas in accordance with the sender's digital signature provided respectively to the plurality of image areas included in the image file received by the receiving section and the receiver's digital signature acquire by the digital signature acquiring section; and an output section for outputting image areas selected by the image area selecting section.

These and other objects, features and advantages of the present invention will become more apparent upon reading of the following detailed description along with the accompanied drawings.

BRIEF DESCRIPTION OF THE DRAWINGS

FIGS. 7A-7C schematically show the image file transmission processing in accordance with the present embodiment.

DETAILED DESCRIPTION OF THE PREFERRED EMBODIMENTS

Figure 1:
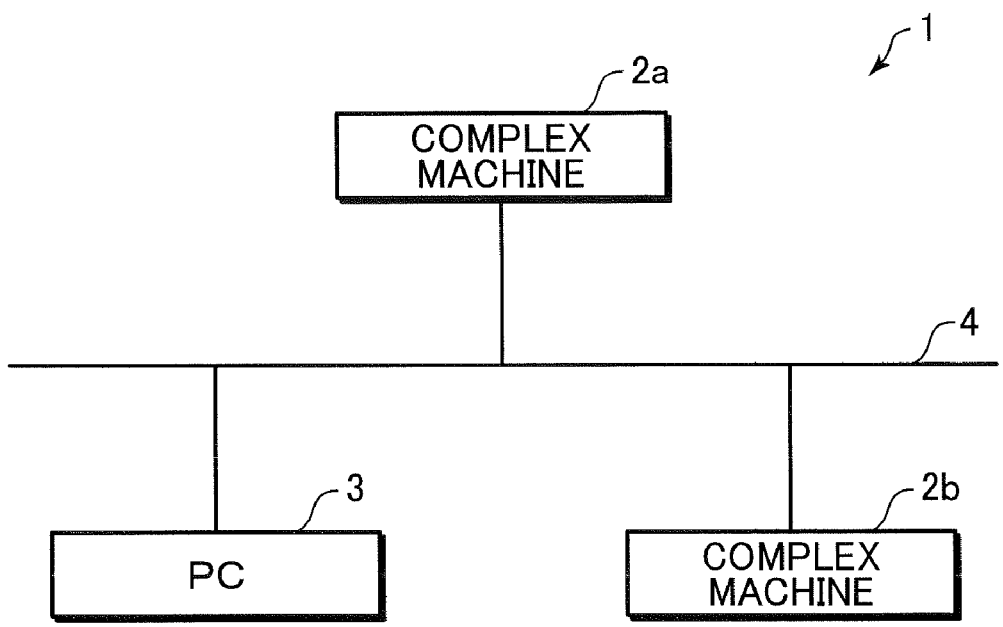
FIG. 1 is a network configuration diagram of an image transfer system in accordance with the present embodiment.

Hereinafter, an image forming apparatus and an image transfer system in accordance with an embodiment of the present invention will be described with reference to the drawings. Configurations identified by the same reference signs in the drawings have the same configurations, and description of those will be omitted. Further, the embodiment described herebelow is an example embodying the present invention, and it has no characteristic of limiting the technical scope of the present invention.

FIG. 1 is a network configuration diagram showing an image transfer system in accordance with the present embodiment. The image transfer system 1 shown in FIG. 1 includes complex machines 2a and 2b, and a PC (personal computer) 3. The complex machine 2a is connected to the complex machine 2b and the PC 3 via a LAN (Local Area Network) 4. The complex machine 2a is an example of the image forming apparatus, and the complex machine 2b and the PC3 are examples of the external equipment.

In the example shown in FIG. 1, the complex machine 2a is connected to the complex machine 2b and the PC 3. However, the present invention is not especially limited to this. The complex machine 2a may be connected to one or more PCs 3 and one or more complex machines 2b. Further, the complex machine 2a may be connected only to one or more PC 3, or only to one or more complex machines 2b.

The complex machines 2a and 2b are digital complex machines having a copying function, a facsimile function, a network printer function, and a scanner function. The PC 3 is a normal personal computer having a communication function and receives image data read in the complex machines 2a and 2b.

Figure 2:
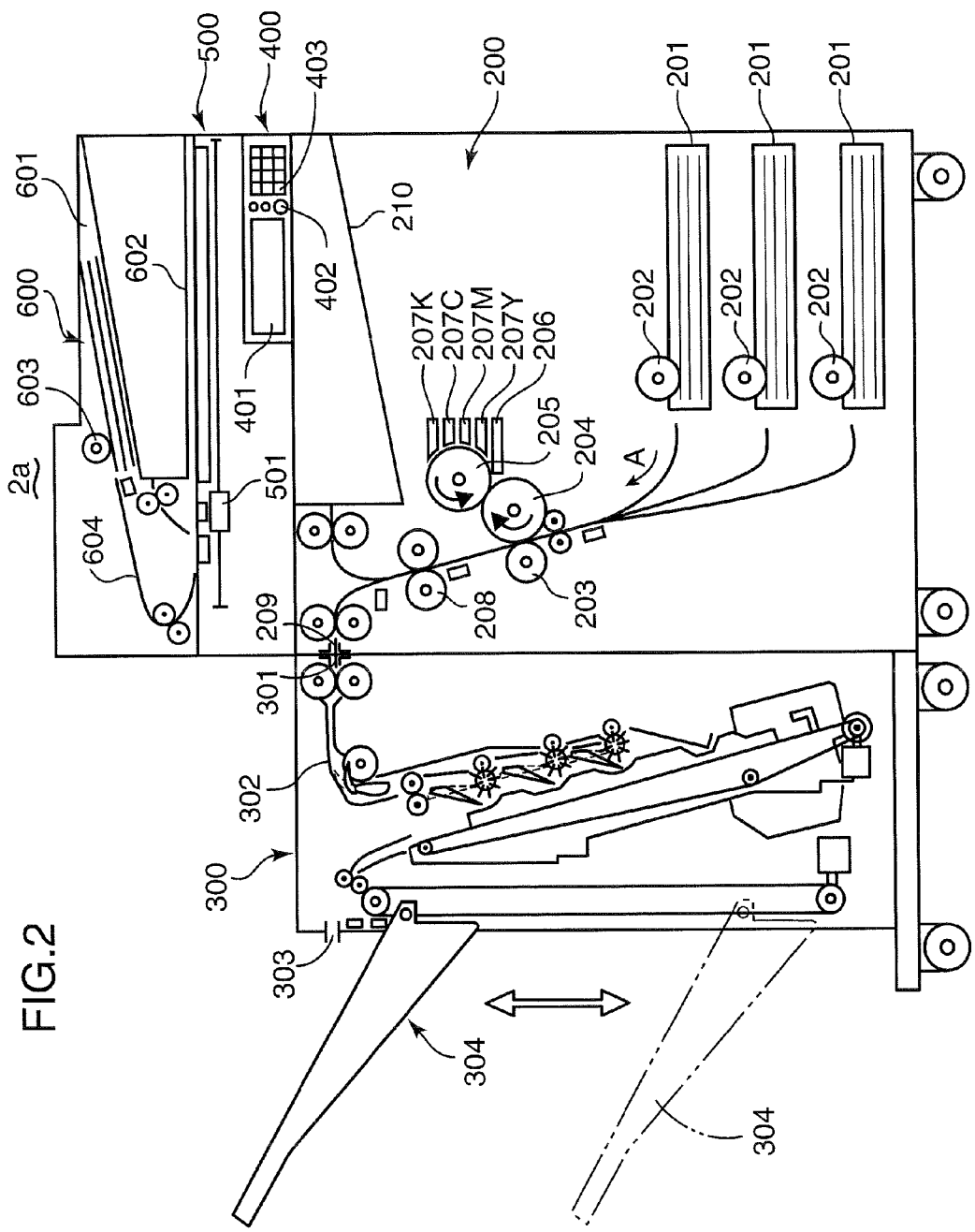
FIG. 2 shows an internal configuration of the complex machine shown in FIG. 1.

FIG. 2 shows an internal configuration of the complex machine 2a shown in FIG. 1. Since an internal configuration of the complex machine 2b is the same as the internal configuration of the complex machine 2a, description of the complex machine 2b will be omitted. The complex machine 2a includes a main body 200, a sheet post-processing section 300 provided on the left side of the main body 200, an operating section 400 for allowing a user to input various operating instructions, a document reading section 500 provided in an upper portion of the main body 200, and a document feeding section 600 provided on top of the document reading section 500.

The operating section 400 includes a touch panel 401, a start key 402, and numerical keys 403. The touch panel 401 displays various operation screens, and various operation buttons for allowing a user to input various operating instructions. The start key 402 is adapted to allow a user to input a command to perform a printing. The numerical keys 403 are used for inputting the number of copies and the like.

The document feeding section 600 includes a document holding portion 601, a document discharging portion 602, a sheet feeding roller 603, and a document conveying portion 604. The document reading section 500 includes a scanner 501. The sheet feeding roller 603 takes out a document set on the document holding portion 601, and the document conveying portion 604 conveys the documents one after another sequentially to the scanner 501. The scanner 501 sequentially reads the documents conveyed by the document conveying portion 604. The document conveying portion 604 discharges the read documents to the document discharging portion 602.

The main body 200 includes a plurality of sheet feeding cassettes 201, a plurality of sheet feeding rollers 202, a transferring roller 203, an intermediate transferring roller 204, a photoconductive drum 205, an exposure device 206, developing devices 207Y, 207M, 207C, and 207K for respective colors including yellow, magenta, cyan, and black, a fixing roller 208, a sheet-discharging slot 209, and a sheet-discharging tray 210.

The photoconductive drum 205 is uniformly charged by a charging device (not illustrated) while being rotated in a direction of an arrow. The exposure device 206 converts a modulation signal, which is generated based on print data of a document read in the document reading section 500, into a laser light and outputs the laser light to form electrostatic latent images for respective colors on the photoconductive drum 205. The developing devices 207Y, 207M, 207C, and 207K supply developers of respective colors to the photoconductive drum 205 to form toner images of respective colors.

The toner images of respective colors are transferred photoconductive drum 205 to the intermediate transferring roller 204, so that a color toner image is formed on the intermediate transferring roller 204.

On the other hand, the sheet feeding roller 202 takes out a recording sheet from the sheet feeding cassette 201 storing recording sheets and conveys the recording sheet to the transferring roller 203. The transferring roller 203 allows the toner image formed on the intermediate transferring roller 204 to be transferred to the conveyed recording sheet, and the fixing roller 208 heats the transferred toner image to fix the toner image onto the recording sheet. After that, the recording sheet is conveyed from the sheet-discharging slot 209 of the main body 200 to the sheet post-processing section 300. Further, the recording sheet is discharged also to the sheet-discharging tray 210 as needed.

The sheet post-processing section 300 includes a conveying-in slot 301, a recording sheet conveying section 302, a conveying-out slot 303, and a stack tray 304. The recording sheet conveying section 302 sequentially conveys the recording sheets conveyed from the sheet-discharging slot 209 into the conveying-in slot 301, and finally discharges the recording sheets from the conveying-out slot 303 to the stack tray 304. The stack tray 304 is so configured as to be movable up and down in a direction of an arrow in accordance with the number of stacked recording sheets conveyed out through the conveying-out slot 303.

Figure 3:
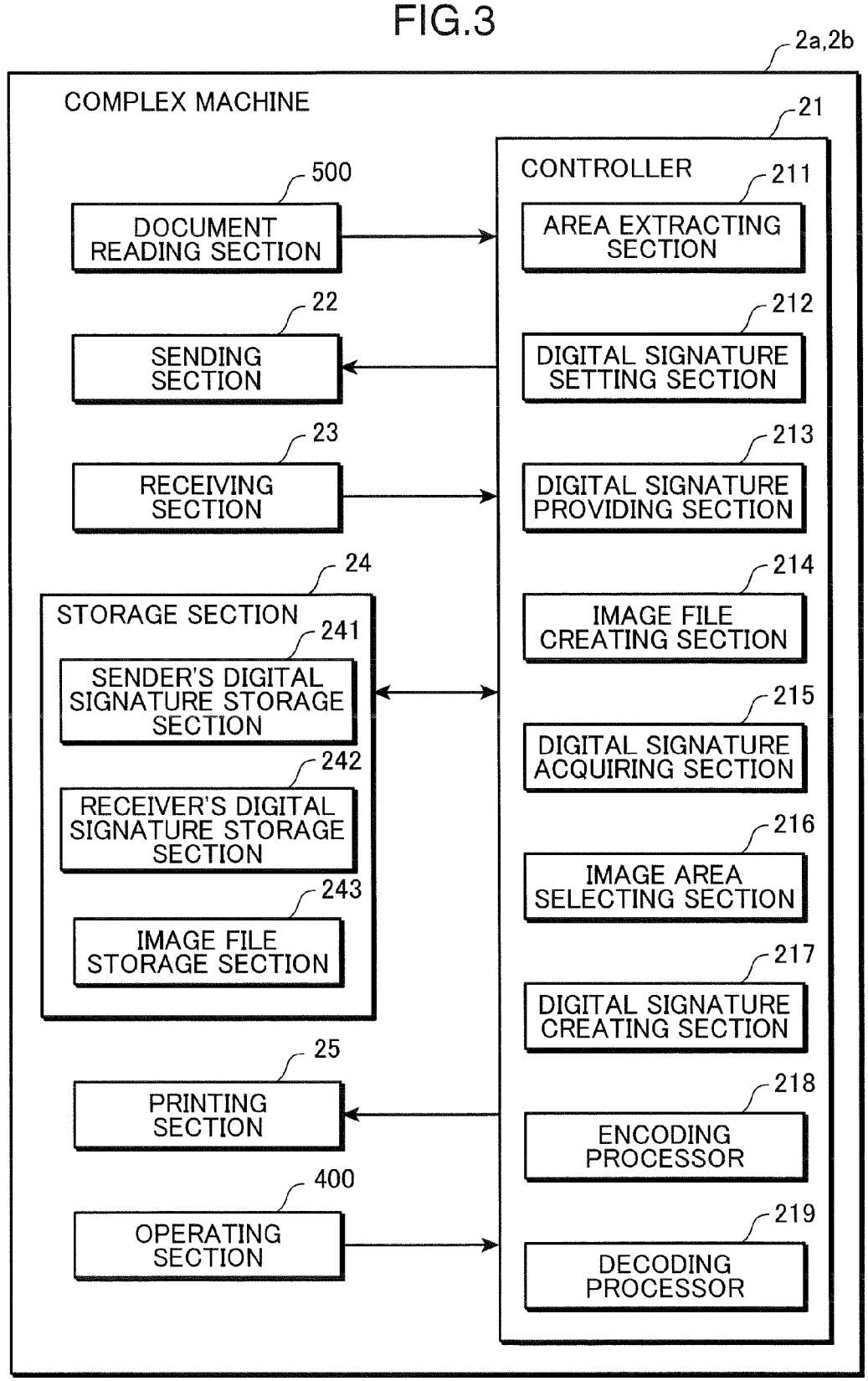
FIG. 3 is a block diagram showing a configuration of the complex machine in accordance with the present embodiment.

FIG. 3 is a block diagram showing a configuration of the complex machine in accordance with the present embodiment. The complex machines 2a and 2b include a controller 21, a sending section 22, a receiving section 23, a storage section 24, a printing section 25, an operating section 400, and a document reading section 500.

The controller 21 includes a CPU (Central Processing Unit), a ROM (Read Only Memory), and a RAM (Random Access Memory) so as to totally control the complex machine. The controller 21 includes an area extracting section 211, a digital signature setting section 212, a digital signature providing section 213, an image file creating section 214, a digital signature acquiring section 215, an image area selecting section 216, a digital signature creating section 217, an encoding processor 218, and a decoding processor 219.

The area extracting section 211 separates and extracts a plurality of image areas from a document image read by the document reading section 500. The image areas include character areas including characters, and background areas including pictures or the like other than characters. The area extracting section 211 separates and extracts the character areas and background areas from a document image. As a method for separating the character areas and background areas, a known method may be adopted in which a line memory is developed by synchronizing pixel values of a predetermined numbers of lines, and observed pixels at a center among a plurality of adjacent addresses are compared with pixel values in periphery so as to determine characters while moving in a sequential direction. Further, known methods disclosed in, for example, Japanese Patent Unexamined Publication Nos. 2003-283848 and H8-149298 may be used.

The digital signature setting section 212 sets sender's digital signatures to the background areas, and sets sender's digital signatures for respective colors of characters in the character areas. For example, the digital signature setting section 212 sets different sender's digital signatures for the background areas, red characters, blue characters, green characters, and black characters. How the sender's digital signatures are set respectively for the background areas, the red characters, the blue characters, the green characters, and the black characters is determined by a user through the operating section 400. In other words, the operating section 400 receives inputs of the sender's digital signatures to be set respectively for the background areas and colors of the characters in the character areas. The sender's digital signatures set for the background areas and colors of the characters in the character areas are stored in the sender's digital signature storage section 241.

The digital signature providing section 213 provides the sender's digital signatures respectively to the image areas in accordance with the degrees of secrecy of the image areas extracted by the area extracting section 211. Further, the digital signature providing section 213 refers to the sender's digital signature storage section 241 to provide the sender's digital signatures associated with the background areas and colors of the characters in the character areas among the plurality of image areas extracted by the area extracting section 211.

The image file creating section 214 creates an image file including the plurality of image areas to which the sender's digital signatures are provided by the digital signature providing section 213. The image file creating section 214 creates an image file of a file format capable of individually managing the plurality of image areas. In particular, an image file of an XPS (XML Paper Specification) format is created. The file of an XPS format is presented as one file, but it includes various data in a file format type. Therefore, digital signatures can be provided respectively to the data.

In the present embodiment, an image file of an XPS format is created. However, the present invention is not especially limited to this. An image file of a PDF (Portable Document Format) format or a JPEG format may be created, and a file of any format may be created as long as the plurality of image areas (data) included in one image file can be managed individually.

As described above, since an image file of a file format capable of individually managing a plurality of image areas is created, not only one sender's digital signature is provided to one image file. The sender's digital signatures are provided respectively to the plurality of image areas included in one image file.

The sending section 22 sends the image file created by the image file creating section 214. The receiving section 23 receives the image file sent by the sending section 22. Further, the receiving section 23 stores the received image file to the image file storage section 243.

The digital signature acquiring section 215 acquires receiver's digital signatures for restricting image areas, which are included in the plurality of image areas, to be presented to a user from among a plurality of image areas. The receiver's digital signatures include the sender's digital signatures associated with image areas which can be presented to a user. For example, in the case where only characters of red and black included in a document image described with characters of red, green, blue, and black are outputted, the receiver's digital signatures include the sender's digital signatures associated with the characters of red and black.

The image area selecting section 216 selects image areas to be presented to a user from among the plurality of image areas in accordance with the sender's digital signatures provided respectively to the plurality of image areas included in the image file received by the receiving section 23 and the receiver's digital signatures acquired by the digital signature acquiring section 215. In other words, the image area selecting section 216 selects image areas provided with the sender's digital signatures, which are included in the sender's digital signatures provided respectively to the plurality of image areas included in the image file received by the receiving section 23, matching with the receiver's signatures acquired by the digital signature acquiring section 215, as image areas to be presented to a user.

The digital signature creating section 217 creates receiver's digital signatures. Which of the sender's digital signatures included in the receiver's digital signatures is to be set is created by a user through the operating section 400. In other words, the operating section 400 receives inputs of the receiver's digital signatures from a user. The sending section 22 sends the receiver's digital signatures, which are created by the digital signature creating section 217, together with the image file created by the image file creating section 214.

The sending section 22 may associate the image file with the receiver's digital signatures and thereafter send the image file and the receiver's digital signatures separately. In other words, the sending section 22 attaches identification information capable of identifying the image file to the receiver's digital signatures and sends the same. Further, the receiving section 23 receives the receiver's digital signatures sent by the sending section 22. The digital signature acquiring section 215 acquires the receiver's digital signatures received by the receiving section 23.

The encoding processor 218 encodes the image areas provided with the sender's digital signatures. The image file creating section 214 creates an image file including a plurality of encoded image areas which are provided with the sender's signatures by the digital signature providing section 213. The decoding processor 219 decodes the encoded image areas. Each of the complex machines 2a and 2b in the present embodiment is provided with the encoding processor 218 and the decoding processor 219. However, the present invention is not especially limited to this. The encoding processor 218 and the decoding processor 219 may be omitted from each of the complex machines 2a and 2b. As described above, encoding the image areas may improve a security function.

The storage section 24 includes an EEPROM (Electronically Erasable and Programmable Read Only Memory) and is provided with a sender's digital signature storage section 241, a receiver's digital signature storage section 242, and an image file storage section 243.

The sender's digital signature storage section 241 associates the background areas and colors of the characters in the character area with the sender's digital signatures which are set by the digital signature setting section 212 respectively for the background areas and colors of characters in the character area, and stores the same.

The receiver's digital signature storage section 242 stores the receiver's digital signatures in advance. The digital signature acquiring section 215 acquires the receiver's digital signatures stored in the receiver's digital signature storage section 242. When the receiver's digital signatures are received together with the image file, the digital signature acquiring section 215 acquires the received receiver's digital signatures from the receiving section 23. When the receiver's digital signatures are not received together with the image file, the digital signature acquiring section 215 acquires the receiver's digital signatures which are stored in advance from the receiver's digital signature storage section 242. The image file storage section 243 stores the image file received by the receiving section 23.

The printing section 25 includes the transferring roller 203, the intermediate transferring roller 204, the photoconductive drum 205, the exposure device 206, and the developing devices 207Y, 207M, 207C, and 207K, which are shown in FIG. 2, and prints the image areas selected by the image area selecting section 216 onto a recording sheet.

Figure 4:
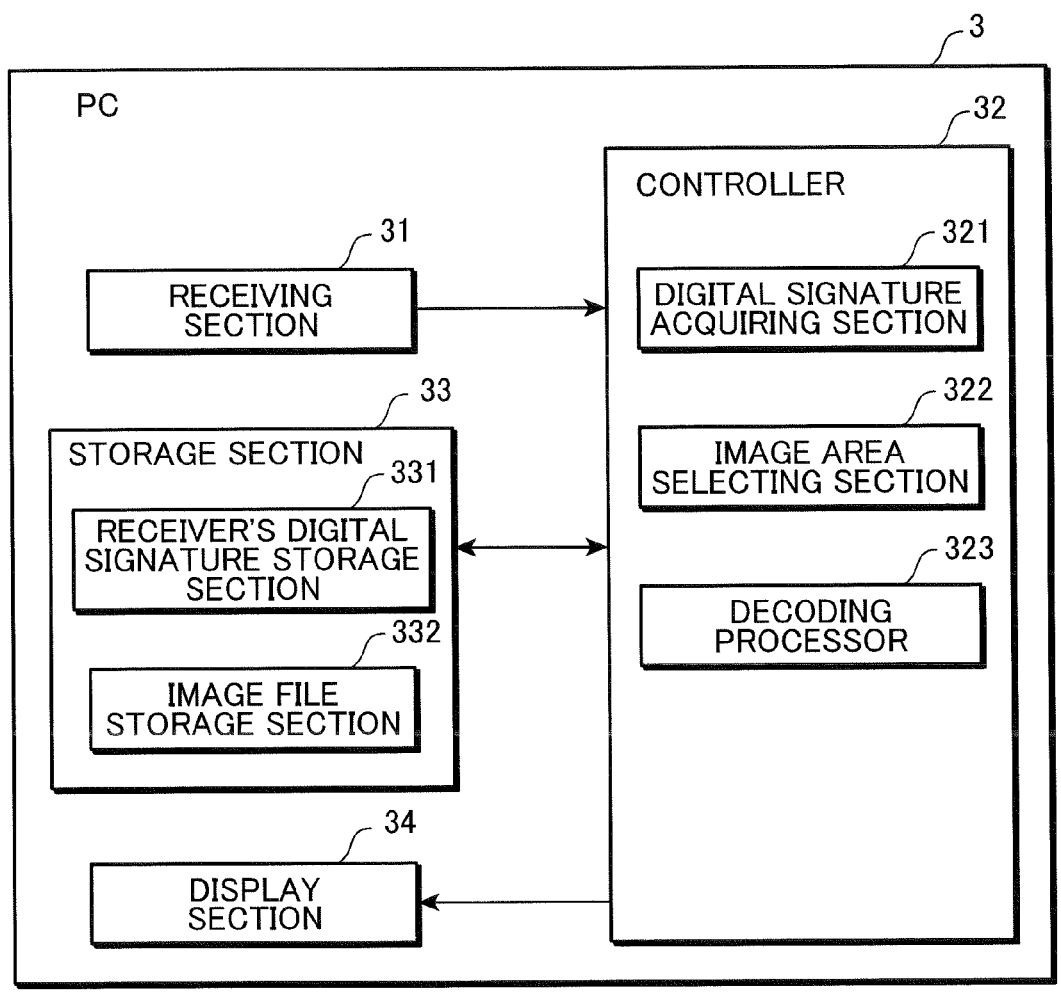
FIG. 4 is a block diagram showing a configuration of a PC in accordance with the present embodiment.

FIG. 4 is a block diagram showing a configuration of a PC in accordance with the present embodiment. The PC 3 includes a receiving section 31, a controller 32, a storage section 33, and a display section 34.

The receiving section 31 receives the image file sent by the sending section 22 of the complex machine 2a. A configuration of the receiving section 31 is the same as the configuration of the receiving section 23 of the receiving section 23 shown in FIG. 3. Accordingly, detailed description will be omitted.

The controller 32 is configured by a CPU, a ROM, and a RAM, and totally controls the PC. The controller 32 includes a digital signature acquiring section 321 and an image area selecting section 322. Configurations of the digital signature acquiring section 321 and the image area selecting section 322 are the same as the configurations of the digital signature acquiring section 215 and the image area selecting section 216 shown in FIG. 3. Accordingly, description will be omitted.

The storage section 33 is configured by an HDD (Hard Disk Drive) and the like, and is provided with a receiver's digital signature storage section 331 and an image file storage section 332. Configurations of the receiver's digital signature storage section 331 and the image file storage section 332 are the same as the configurations of the receiver's digital signature storage section 242 and the image file storage section 243 shown in FIG. 3. Accordingly, description will be omitted.

The display section 34 is configured by a liquid crystal display device and the like, and displays image areas selected by the image area selecting section 322 on a screen.

Figure 5:
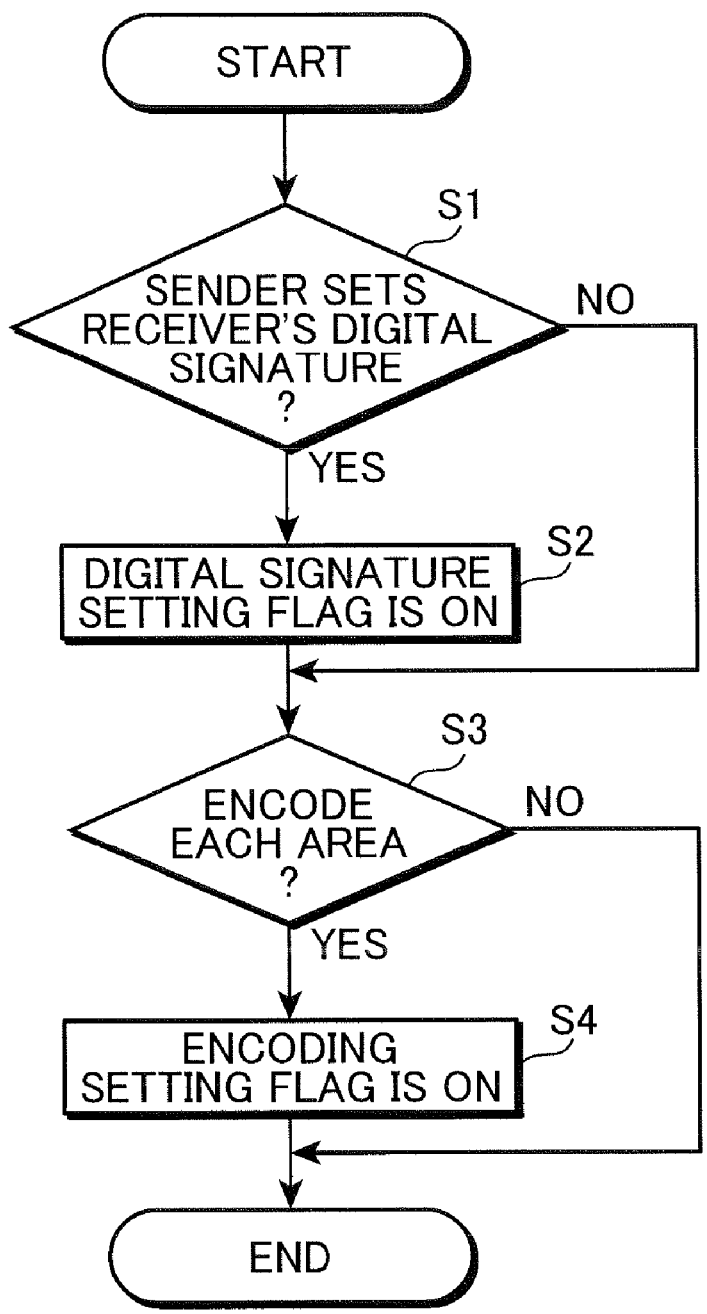
FIG. 5 is a flowchart showing a preprocessing performed prior to an image file transmission processing.

Next, an image file transmission processing performed by the complex machine 2a shown in FIG. 3 will be described. FIG. 5 is a flowchart showing a preprocessing which is performed prior to the image file transmission processing.

Firstly, in step S1, the digital signature setting section 212 determines whether a sender sets receiver's digital signatures. When it is determined that the sender does not set the receiver's digital signatures (NO in step S1), the routine proceeds to a processing of step S3. On the other hand, when it is determined that the sender sets the receiver's digital signatures (YES in step S1), in step S2, the digital signature setting section 212 turns on a digital signature setting flag presenting whether the sender sets the receiver's digital signatures in step S2. When the digital signature setting flag is turned on, the sender sets the receiver's digital signatures.

Next, in step S3, the encoding processor 218 determines whether each of the image areas are to be encoded. When it is determined that each of the image areas is not to be encoded (NO in step S3), the processing is terminated. On the other hand, when it is determined that each of the image areas is to be encoded (YES in step S3), in step S4, the encoding processor 218 turns on an encoding setting flag presenting whether each of the image areas is to be encoded. When the encoding setting flag is turned on, each of the image areas is encoded.

Figure 6:
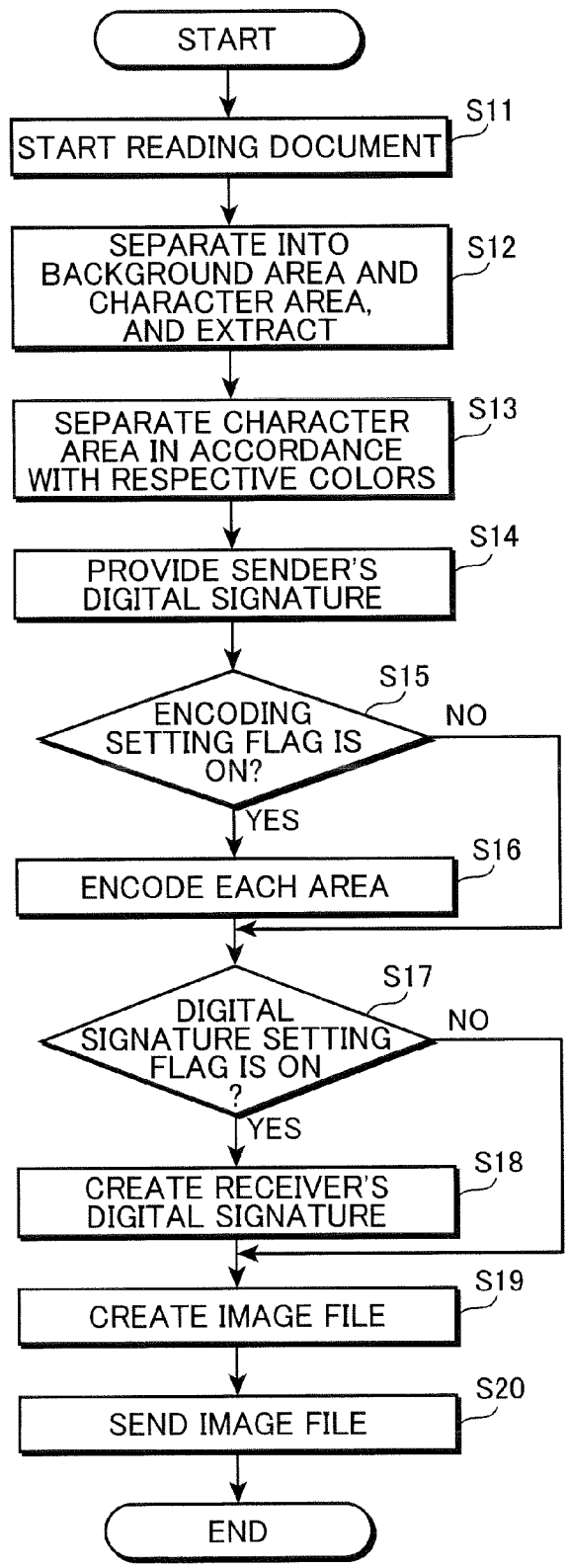
FIG. 6 is a flowchart showing an image file transmission processing performed in the complex machine.

FIG. 6 is a flowchart showing the image file transmission processing performed by the complex machine 2a. FIGS. 7 and 8 schematically show the image file transmission processing in accordance with the present embodiment.

Firstly, in step S11, the document reading section 500 reads a document. Next, in step S12, the area extracting section 211 separates and extracts character areas and background area from the document image read by the document reading section 500. A document image GG is configured by a character area FR and a background area HR (refer to FIG. 7A). The area extracting section 211 separates and extracts the character area FR and the background area HR from the document image GG (refer to FIG. 7B).

Next, in step S13, the area extracting section 211 further separates and extracts the character area in accordance with respective colors of the character area based on color information of the character area. In other words, each pixel of the character area has color information, and the area extracting section 211 separates and extracts the characters of the character area in accordance with respective colors based on the color information. For example, in the present embodiment, since characters of red, green, blue and black are used, the area extracting section 211 further separates the character area into character areas corresponding to characters of red, green, blue, and black and extracts the same. In the example shown in FIG. 7C, the character "A" is described in red, and the character "B" is described in green, and the character "C" is described in blue. The area extracting section 211 separates and extracts a character area FR1 configured by the red character, a character area FR2 configured by the green character, and a character area FR3 configured by the blue character, from the character area FR.

Figure 8B:
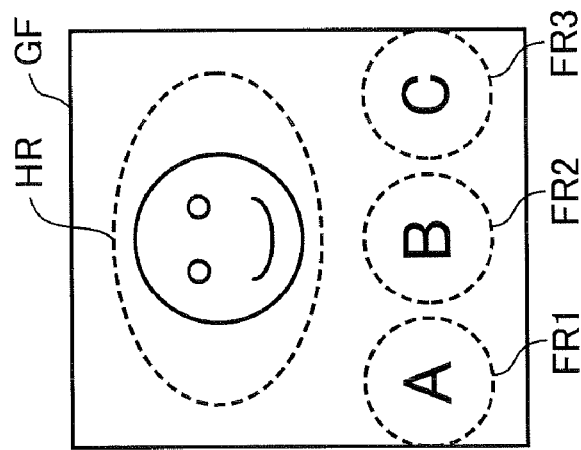
FIGS. 8A and 8B schematically show the image file transmission processing in accordance with the present embodiment.
Figure 8A:
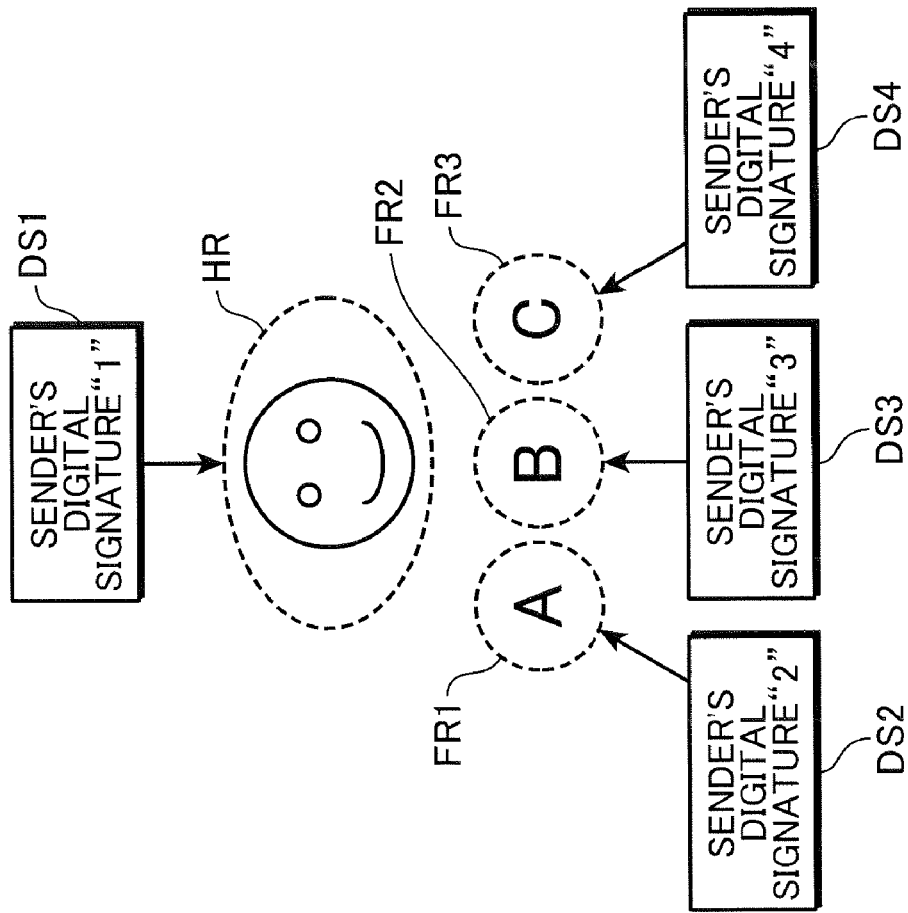

Referring back to FIG. 6, next in step S14, the digital signature providing section 213 refers to the sender's digital signature storage section 241 and provides sender's digital signatures associated with the background area and colors of the characters in the character area among the plurality of image areas extracted by the area extracting section 211. As shown in FIG. 8A, a sender's digital signature DS1 presented as "1" is provided to the background area HR, and a sender's digital signature DS2 presented as "2" is provided to the character area FR1, and a sender's digital signature DS3 presented as "3" is provided to the character area FR2, and a sender's digital signature DS3 presented as "4" is provided to the character area FR3.

Referring back to FIG. 6, next in step S15, the encoding processor 218 determines whether the encoding setting flag is turned on. When it is determined that the encoding setting flag is not turned on (NO in step S15), the routine proceeds to a processing of step S17. On the other hand, when it is determined that the encoding setting flag is turned on (YES in step S15), the encoding processor 218 encodes the background area and the character areas provided with the sender's digital signatures.

Next, in step S17, the digital signature creating section 217 determines whether the digital signature setting flag is turned on. Here, when it is determined that the digital signature setting flag is not turned on (NO in step S17), the routine proceeds to a processing of step S19. On the other hand, when it is determined that the digital signature setting flag is turned on (YES in step S17), the digital signature creating section 217 creates a receiver's digital signature in step S18.

Next, in step S19, the image file creating section 214 creates an image file including the background area and the character areas which are provided with sender's digital signatures by the digital signature providing section 213. As shown in FIG. 8B, an image file GF includes the background area HR provided with the sender's digital signature DS1, the character area FR1 provided with the sender's digital signature DS2, the character area FR2 provided with the sender's digital signature DS3, and the character area FR3 provided with the sender's digital signature DS4. The areas HR, FR1, FR2, and FR3 are stored as individual files in one image file GF.

Referring back to FIG. 6, next in step S20, the sending section 22 sends the image file created by the image file creating section 214 to an external equipment (the complex machine 2b or the PC 3). At this time, when the receiver's digital signatures are created in step S18, the sending section 22 sends the receiver's digital signatures together with the image file to the external equipment.

Figure 9:
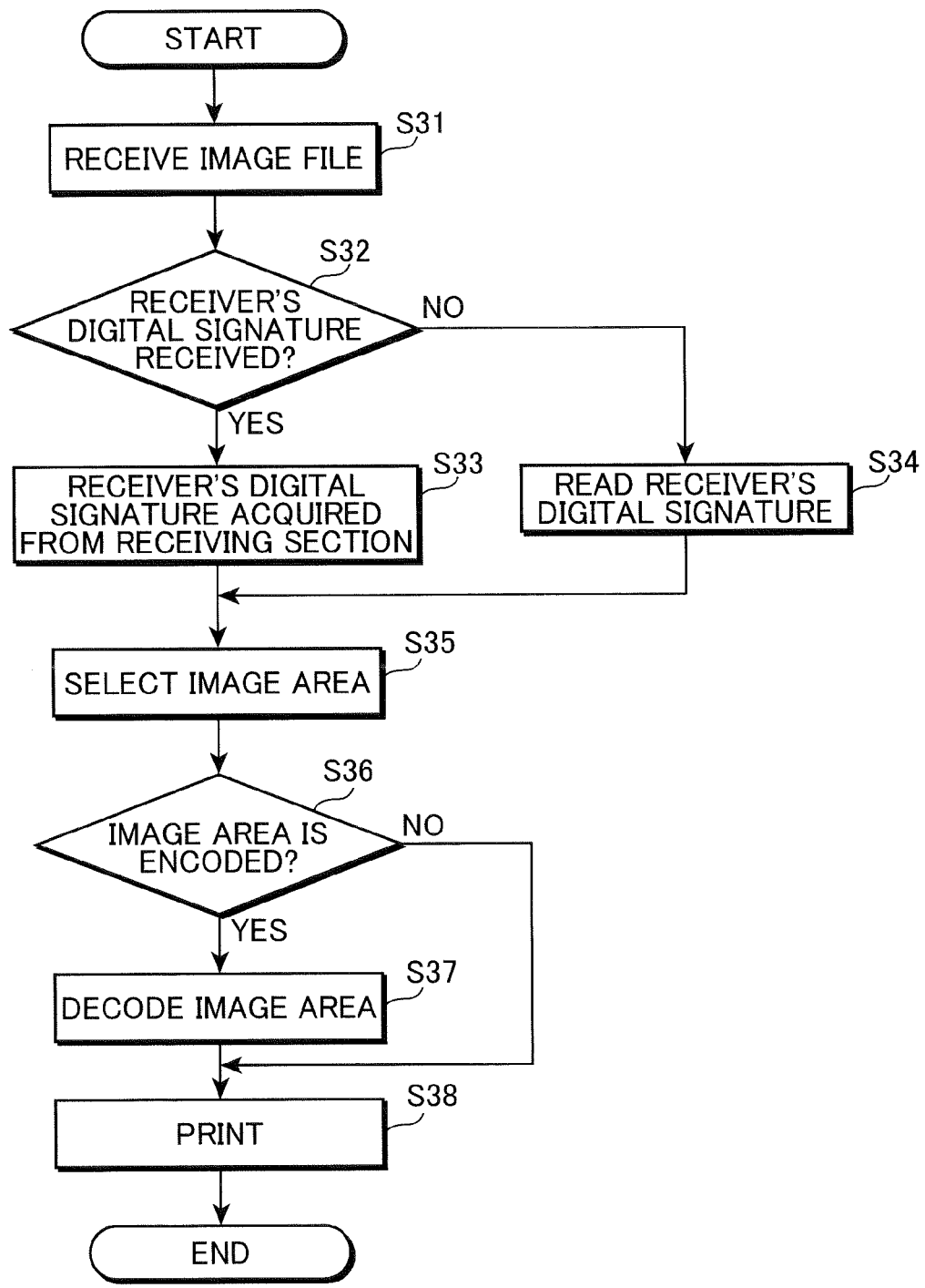
FIG. 9 is a flowchart showing an image file receiving processing performed in the complex machine.

Next, an image file receiving processing performed by the complex machine 2b shown in FIG. 3 will be described. FIG. 9 is a flowchart showing the image file receiving processing performed by the complex machine 2b. FIG. 10 schematically shows an image file receiving processing in accordance with the present embodiment.

Firstly, in step S31, the receiving section 23 receives an image file sent by the sending section 22 of the complex machine 2a. When the receiver's digital signatures are sent by the sending section 22 of the complex machine 2a, the receiving section 23 receives the receiver's digital signatures together with the image file. Next, in step S32, the digital signature acquiring section 215 determines whether the receiver's digital signatures are received by the receiving section 23. Here, when it is determined that the receiver's digital signatures are received (YES in step S32), the digital signature acquiring section 215, in step S33, acquires the receiver's digital signatures received by the receiving section 23. On the other hand, when it is determined that the receiver's digital signatures are not received (NO in step S32), the digital signature acquiring section 215 reads, in step S34, the receiver's digital signatures stored in advance in the receiver's digital signature storage section 242.

As described above, in the complex machine 2a, when the receiver's digital signatures are created, the created receiver's digital signature are sent together with the image file to the complex machine 2b. Then, in the complex machine 2b, the image file and the receiver's digital signatures sent by the complex machine 2a are received. Further, in the receiver's digital signature storage section 242 of the complex machine 2b, the receiver's digital signatures are stored in advance.

When the receiver's digital signatures are received together with the image file, the digital signature acquiring section 215 acquires the received receiver's digital signatures. On the other hand, when the receiver's digital signatures are not received together with the image file, in other words, when only the image file is received, the digital signature acquiring section 215 acquires the receiver's digital signatures stored in the receiver's digital signature storage section 242.

Thus, since the receiver's digital signatures received together with the image file is used in priority over the receiver's digital signatures stored in advance in the receiver side, a security level can be set for each image file to be sent.

Next, in step S35, the image area selecting section 216 opens the image file received by the receiving section 23, and selects image areas provided with sender's digital signatures, which are included in the sender's digital signatures provided respectively to the plurality of image areas included in the image file, matching with the receiver's digital signatures acquired by the digital signature acquiring section 215, as image areas to be presented to a user.

Next, in step S36, the decoding processor 219 determines whether the image areas selected by the image area selecting section 216 are encoded. Here, when it is determined that the selected image areas are not encoded (NO in step S36), the routine proceeds to the processing of step S37. On the other hand, when it is determined that the selected image areas are encoded (YES in step S36), the decoding processor 219 decodes, in step S37, the image areas selected by the image area selecting section 216.

As described above, in the complex machine 2a, the extracted image areas are encoded, and sender's digital signatures in accordance with the degrees of secrecy of the encoded image areas are provided respectively to the image areas. Then, in the complex machine 2b, the selected image areas are decoded, and then the decoded image areas are outputted. Thus, since the image file including the encoded image areas is sent and received, a security function can be improved.

Figure 10A:
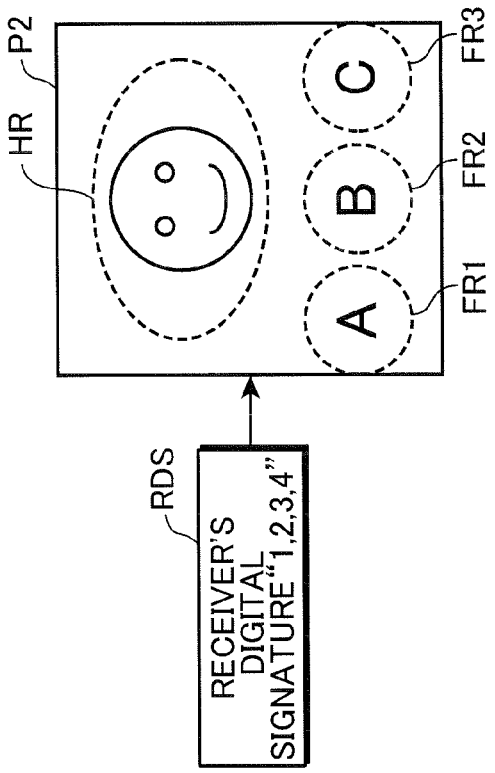
FIGS. 10A and 10B schematically show the image file receiving processing in accordance with the present embodiment.

Next, in step S38, the printing section 25 prints only image areas selected by the image area selecting section 216 to a recording sheet. As shown in FIG. 10A, when the receiver's digital signature RDS is "1, 2", the background area HR provided with the sender's digital signature DS1 of "1" and the character area FR1 provided with the sender's digital signature DS2 of "2" are selected as image areas which can be presented to a user. As a result, only the background area HR and the character area FR1 are printed on a recording sheet P1.

Figure 10B:
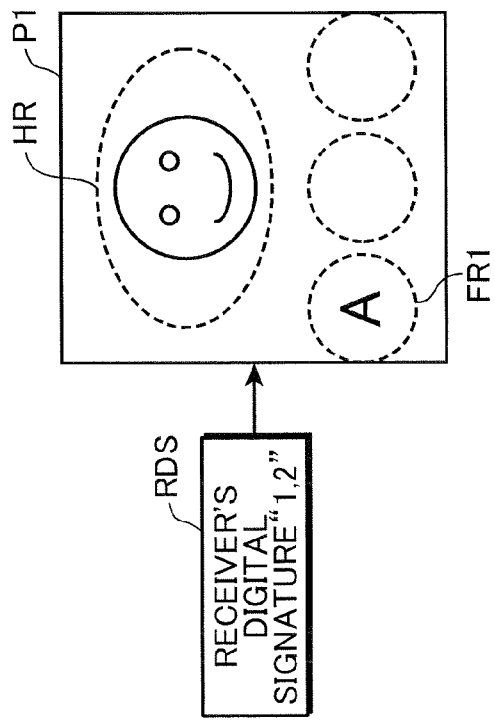

Further, as shown in FIG. 10B, when the receiver's digital signature RDS is "1,2,3,4", only the background area HR provided with the sender's digital signature DS1 of "1", the character area FR1 provided with the sender's digital signature DS2 of "2", the character area FR2 provided with the sender's digital signature DS3 of "3", and the character area FR3 provided with the sender's digital signature DS4 of "4" are selected as image areas which can be presented to a user. As a result, the background area HR, the character area FR1, the character area FR2, and the character area FR3 are printed on a recording sheet P2.

When an external equipment on the receiver's side is the complex machine 2b, the image areas selected by the image area selecting section 216 is printed on a recording sheet, as described above. However, when the external equipment on the receiver's side is the PC 3, the processing of the steps S31-S37 are performed, and then the image areas selected by the image area selecting section 216 are displayed on the display section 34.

As described above, a document is read in the complex machine 2a. A plurality of image areas are separated and extracted from the document image. Sender's digital signatures are provided in accordance with the degrees of secrecy of the extracted image areas. Then, an image file including the plurality of image areas provided with the sender's digital signatures is created, and then the created image file is sent. After that, the complex machine 2b or PC 3 receives the image file sent by the complex machine 2a, and receiver's digital signatures for restricting image areas to be presented to a user are acquired from the plurality of image areas. Then, in accordance with the sender's digital signatures provided respectively to the plurality of image areas included in the received image file and the acquired receiver's digital signatures, the image areas to be presented to a user are selected from the plurality of image areas, and the selected image areas are outputted.

Thus, even in the case where a user who receives the image file is permitted to refer to the secret part in the future, renewing the receiver's digital signatures makes it possible to easily change the image areas to be presented to the user, so that a convenience for a user can be improved while sufficient security is maintained.

Further, the image areas include character areas presenting characters, and background areas other than the character areas. Sender's digital signatures are provided to the character areas and the background areas, so that the characters and the backgrounds to be presented to a user can be changed in accordance with the degrees of secrecy.

Further, in the complex machine 2a, the sender's digital signatures are set respectively for the background area and colors of characters in the character areas. Then, the sender's digital signatures associated with the background areas and colors of the characters in the character areas among the plurality of extracted image areas are provided. Thus, since the sender's digital signatures are set for the background areas and colors of the characters in the character areas, creating a document having secret items separated by colors makes it possible to provide the sender's digital signatures automatically at the time of reading a document.

Furthermore, in the complex machine 2a, the receiver's digital signatures are created, and the created receiver's digital signatures are sent. Then, in the complex machine 2b or the PC 3, the receiver's digital signature sent by the complex machine 2a are received, and the received receiver's digital signatures are acquired thus, since the receiver's digital signatures created in the complex machine 2a are sent to the complex machine 2b or the PC 3, security levels can be freely set in accordance with an addressee.

Further, in the complex machine 2a, 2b, or the PC 3, the receiver's digital signatures are stored in advance, and the stored receiver's digital signatures are acquired. Thus, renewing the receiver's digital signatures stored in advance makes it possible to easily change the security level.

Further, the receiver's digital signatures include sender's digital signatures associated with image areas which can be presented to a user. Then, the image areas provided with the sender's digital signatures, which are included in the sender's digital signatures provided respectively to the plurality of image areas included in the received image file, matching with the sender's digital signatures are selected as image areas to be presented to a user. Thus, changing the sender's digital signatures to be included in the receiver's digital signatures of the addressee makes it possible to easily change the security level.

In the present embodiment, the receiver's digital signatures include sender's digital signatures associated with the image areas which can be presented to a user, and the image area selecting section 216 selects image areas provided with sender's digital signatures, which are included in the sender's digital signatures provided respectively to the plurality of image areas included in an image file, matching with the receiver's digital signatures as image areas to be presented to a user. However, the present invention is not especially limited to this. The receiver's digital signatures may include values (value or character) presenting a range of sender's digital signatures associated with image areas to be presented to a user, and the image area selecting section 216 may select image areas provided with sender's digital signatures, which are included in the sender's digital signatures provided respectively to the plurality of image areas included in an image file, matching with the range presented by the value of the receiver's digital signatures as image areas to be presented to a user. FIG. 11 schematically shows image file receiving processing in accordance with a modified example of the present embodiment.

Figure 11B:
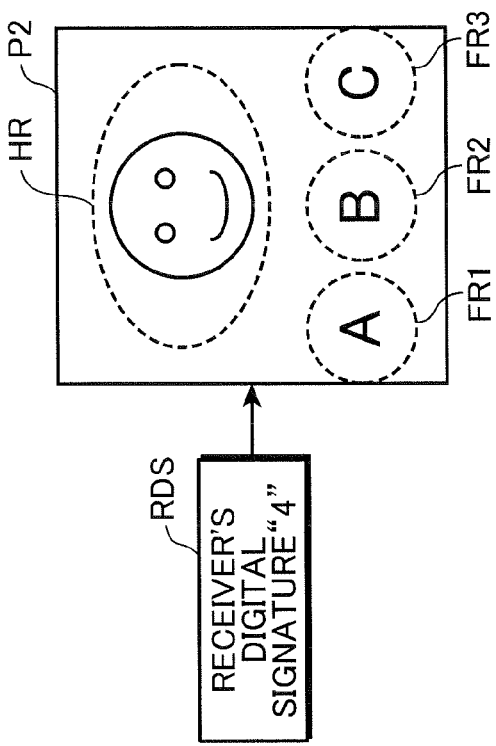
FIGS. 11A and 11B schematically show the image file receiving processing in accordance with a modified example of the present embodiment.
Figure 11A:
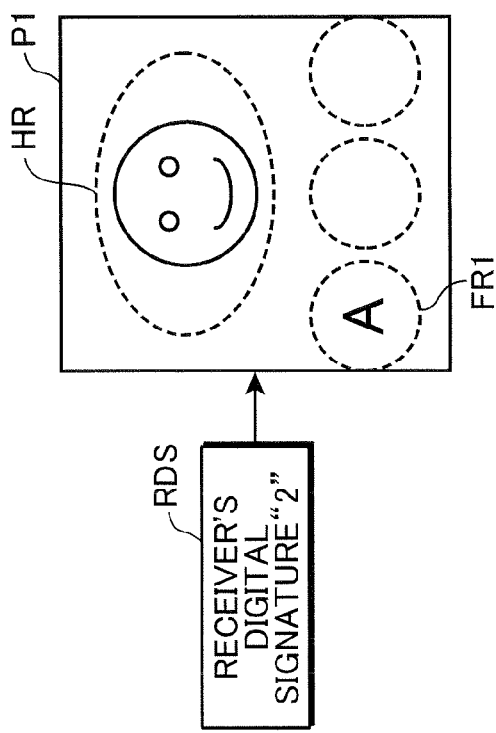

As shown in FIG. 11A, when the receiver's digital signature RDS is "2", the background area HR provided with the sender's digital signature DS1 of "1" and the character area FR1 provided with the sender's digital signature DS2 of "2" are selected as image areas which can be presented to a user. In other words, the value "2" presented by the receiver's digital signature RDS indicates a range "1" to "2" of values of the sender's digital signatures. As a result, only the background area HR and the character area FR1 are printed on the recording sheet P1.

Further, as shown in FIG. 11B, when the receiver's digital signature RDS is "4", the background area HR provided with the sender's digital signature DS1 of "1", the character area FR1 provided with the sender's digital signature DS2 of "2", the character area FR2 provided with the sender's digital signature DS3 of "3", and the character area FR3 provided with the sender's digital signature DS4 of "4" are selected as image areas which can be presented to a user. In other words, the value "4" presented by the receiver's digital signature RDS indicates the range "1" to "4" of the values of the sender's digital signature. As a result, the background area HR, the character area FR1, the character area FR2, and the character area FR3 are printed on the recording sheet P2.

Figure 12:
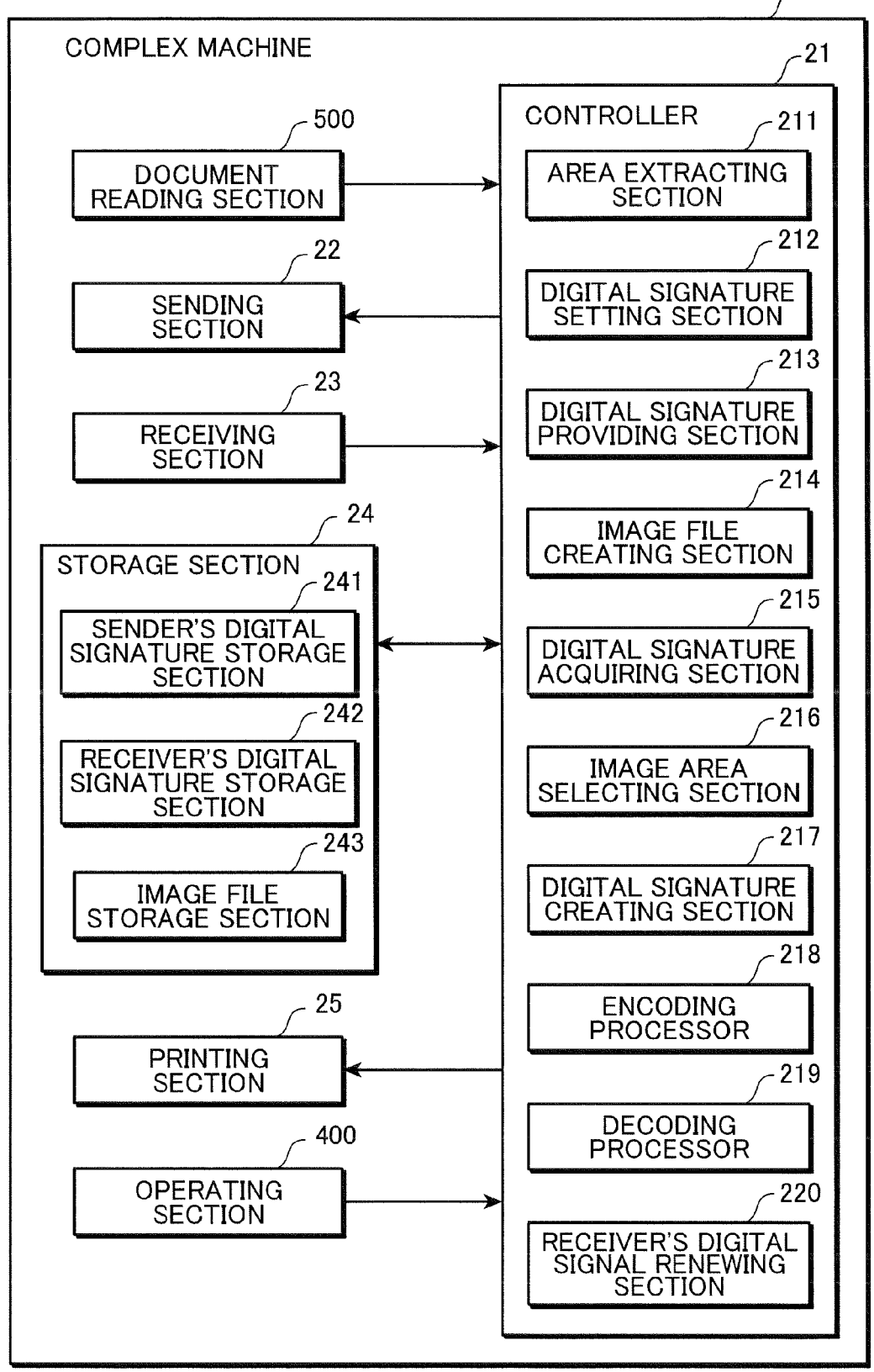
FIG. 12 is a block diagram showing a configuration of the complex machine in accordance with the modified example of the present embodiment.

Further, receiver's digital signatures stored in the receiver's digital signature storage section 242 may be renewed appropriately. FIG. 12 is a block diagram showing a configuration of a complex machine in accordance with a modified example of the present embodiment. In the complex machine shown in FIG. 12, the configurations which are the same as those of the complex machine shown in FIG. 3 will be provided with the same reference signs, and description of those will be omitted.

The controllers 21 of the complex machines 2a and 2b are further provided with a receiver's digital signature renewing section 220. The receiver's digital signature renewing section 220 renews receiver's digital signatures stored in the receiver's digital signature storage section 242. In particular, the receiver's digital signature renewing section 220 receives from a user a selection of receiver's digital signature to be renewed and changing of the selected receiver's digital signatures, and overwrite the changed receiver's digital signatures to the receiver's digital signature storage section 242. The controller 32 of the PC 3 may be provided with the receiver's digital signature renewing section 220.

The receiver's digital signature renewing section 220 renews the receiver's digital signatures stored in the receiver's digital signature storage section 242, so that the security level can be changed easily. Further, for example, even in the case where a user who receives the image file is permitted to refer to the secret parts in the future, the image areas to be presented to a user can be changed easily by renewing the receiver's digital signatures.

The embodiment described above mainly includes an invention having the following configurations.

An image transfer system in accordance with an aspect of the present invention includes: an image forming apparatus for forming an image; and an external equipment communicably connected to the image forming apparatus. The image forming apparatus includes: a document reading section for reading a document; an area extracting section for separating and extracting a plurality of image areas from a document image read by the document reading section; a digital signature providing section for providing sender's digital signatures respectively to the image areas extracted by the area extracting section in accordance with degrees of secrecy of the image areas; an image file creating section for creating an image file including a plurality of image areas provided with the sender's digital signatures by the digital signature providing section; and a sending section for sending the image file created by the image file creating section. The external equipment includes: a receiving section for receiving the image file sent by the sending section; a digital signature acquiring section for acquiring receiver's digital signatures for restricting image areas to be presented to a user from among the plurality of image areas; an image area selecting section for selecting image areas to be presented to the user from among the plurality of image areas in accordance with the sender's digital signatures provided respectively to the plurality of image areas included in the image file received by the receiving section and the receiver's digital signatures acquired by the digital signature acquiring section; and an output section for outputting image areas selected by the image area selecting section.

According to this configuration, in the image forming apparatus, a document is read, and a plurality of image areas are separated and extracted from a read document image. The sender's digital signatures are provided to the extracted image areas in accordance with the degrees of secrecy. Then, an image file including the plurality of image areas provided with the sender's digital signatures is created, and the created image file is sent. After that, in the external equipment, the image file sent from the image forming apparatus is received, and receiver's digital signatures for restricting image areas to be presented to a user among the plurality of image areas are acquired. Then, in accordance with the sender's digital signatures provided respectively to the plurality of image areas included in the received image file and the acquired receiver's digital signature, image areas to be presented to a user is selected from among the plurality of image areas, and then the selected image areas are outputted.

Thus, even in the case where a user who receives the image file is permitted to refer to the secret part in the future, renewing the receiver's digital signatures makes it possible to easily change the image areas to be presented to the user. Accordingly, a convenience for a user can be improved while maintaining sufficient security.

Further, in the image transfer system described above, it is preferable that the image areas include a character area presenting a character, and a background area other than the character area. According to this configuration, the image areas include a character area presenting characters and a background area other than the character area. The sender's digital signatures are provided to the character area and the background area, so that characters and background to be presented to a user can be changed in accordance with the degrees of secrecy.

Further, in the image transfer system described above, it is preferable that the image forming apparatus further includes: a setting section for setting the sender's digital signatures in accordance with colors of the background area and colors of the characters in the character area, and the digital signature providing section provides the sender's signatures associated with colors of the background area and colors of the characters in the character area among the plurality of image areas extracted by the area extracting section.

According to this configuration, the sender's digital signatures are set in the image forming apparatus in accordance with the background area and colors of characters in the character area. Then, the sender's digital signatures associated with the background areas and colors of characters in the character area among the plurality of image areas are provided.

Thus, since sender's digital signatures are set in accordance with the background area and colors of the characters in the character area, creating a document having secret parts separated by colors makes it possible to provide sender's digital signatures automatically at a time of reading a document.

Further, in the image transfer system, it is preferable that the image forming apparatus further includes a digital signature creating section for creating the receiver's digital signatures, and the sending section sends the receiver's digital signatures created by the digital signature creating section, and the receiving section receives the receiver's digital signatures sent by the sending section, and the digital signature acquiring section acquires the receiver's digital signature received by the receiving section.

According to this configuration, in an image forming apparatus, receiver's digital signatures are created, and the created receiver's digital signatures are sent. Then, in an external equipment the receiver's digital signatures sent from the image forming apparatus is received, and the received receiver's digital signatures are acquired. Thus, the receiver's digital signatures created in the image forming apparatus are sent to the external equipment. Accordingly the security level can be set freely in accordance with an addressee.

Further, in the image transfer system described above, it is preferable that the external equipment further includes a digital signature storage section for storing the receiver's digital signature, and the digital signature acquiring section acquires the receiver's digital signature stored in the digital signature storage section.

According to this configuration, in an external equipment, receiver's digital signatures are stored in advance, and the stored receiver's digital signatures are acquired. Thus, renewing the receiver's digital signatures stored in advance makes it possible to easily change the security level.

Further, in the image transfer system, it is preferable that the external equipment further includes a receiver's digital signature renewing section for renewing the receiver's digital signal stored in the digital signature storage section.

According to this configuration, the digital signature renewing section renews the receiver's digital signatures stored in the digital signature storage section. Accordingly, the security level can be easily changed. Further, for example, even in the case where a user who receives an image file is permitted to refer to the secret parts, renewing the receiver's digital signatures makes it possible to easily change image areas to be presented to the user.

Further, in the image transfer system described above, the image forming apparatus further includes a digital signature creating section for creating the receiver's digital signatures, and the external equipment further includes a digital signature storage section for storing the receiver's digital signatures, and when the receiver's digital signatures are created by the digital signature creating section, the sending section sends the created receiver's digital signatures together with the image file, and the receiving section receives the image file and the receiver's digital signatures sent by the sending section, and when the receiving section receives the receiver's digital signatures, the digital signature acquiring section acquires the received receiver's digital signatures, and when the receiving section does not receive the receiver's digital signatures, the digital signature acquiring section acquires the receiver's digital signatures stored in the digital signature storage section.

According to this configuration, in the case where receiver's digital signatures are created in the image forming apparatus, the created receiver's digital signatures are sent to the external equipment together with the image file, and the image file and the receiver's digital signatures which are sent from the image forming apparatus are received in the external equipment. Further, in the digital signature storage section of the external equipment, receiver's digital signatures are stored in advance. In the case where the receiver's digital signatures are received together with the image file, the received receiver's digital signature are acquired. On the other hand, in the case where the receiver's digital signatures are not received together with the image file, in other words, only the image file is received, the receiver's digital signatures stored in the digital signature storage section are acquired.

Thus, not the receiver's digital signatures stored in advance in the receiver's side but the receiver's digital signatures received together with the image file are used in priority. Accordingly, the security level can be set in accordance with an image file.

Further, in the image transfer system described above, it is preferable that the receiver's digital signatures include the sender's digital signatures associated with image area which can be presented to a user, and the image area selecting section selects image areas which are provided with the sender's digital signatures, among the sender's digital signatures provided respectively to the plurality of image areas included in the image file received by the receiving section, matching with the receiver's digital signatures acquired by the digital signature acquiring section.

According to this configuration, the receiver's digital signatures include sender's digital signatures associated with image areas which can be presented to a user. Then, image areas provided with sender's digital signatures, among the sender's digital signatures provided respectively to the plurality of image areas included in the received image file, matching with acquired receiver's digital signatures are selected as image areas to be presented to a user. Thus, changing the sender's digital signatures to be included in the receiver's digital signatures for an addressee makes it possible to easily change the security level.

Further, in the image transfer system described above, it is preferable that the image file creating section creates an image file of a file type capable of managing the plurality of image areas individually.

According to this configuration, an image file of a file format capable of managing a plurality of image areas individually is created. Accordingly, not a sender's digital signature is provided for one image file, but sender's signatures can be provided respectively for a plurality of image areas included in one image file.

Further, in the image transfer system described above, it is preferable that the image forming apparatus further includes an encoding processor for encoding the image areas extracted by the area extracting section, and the digital signature providing section provides sender's digital signatures to the image areas respectively in accordance with degrees of secrecy of the image areas encoded by the encoding processor, and the external equipment further includes a decoding processor for decoding the image areas selected by the image area selecting section, and the output section outputs the image areas decoded by the decoding processor.

According to this configuration, in the image forming apparatus, the extracted image areas are encoded, and sender's digital signatures are provided respectively to the image areas in accordance with the degrees of secrecy of the encoded image areas. Then, in the external equipment, the selected image areas are decoded, and the decoded image areas area outputted.

Thus, since an image file including the encoded image area is sent and received, a security function can be improved.

An image forming apparatus in accordance with another aspect of the present invention includes a document reading section for reading a document; an area extracting section for separating and extracting a plurality of image areas from a document image read by the document reading section; a digital signature providing section for providing a sender's digital signatures to each of the image areas extracted by the area extracting section in accordance with respective degree of secrecy of the image areas; an image file creating section for creating an image file including a plurality of image areas provided with the sender's digital signature by the digital signature providing section; a sending section for sending the image file created by the image file creating section; a receiving section for receiving the image file sent by the sending section; a digital signature acquiring section for acquiring receiver's digital signatures for restricting image areas to be presented to a user from among the plurality of image areas; an image area selecting section for selecting image areas to be presented to the user from among the plurality of image areas in accordance with the sender's digital signature provided respectively to the plurality of image areas included in the image file received by the receiving section and the receiver's digital signature acquire by the digital signature acquiring section; and an output section for outputting image areas selected by the image area selecting section.

According to this configuration, a document is read, and a plurality of image areas are separated and extracted from the read document image, so that sender's digital signatures are provided respectively to image areas in accordance with the degrees of secrecy of the extracted image areas. Then, an image file including a plurality of image areas provided with the sender's digital signatures is created, and the created image file is sent. On the other hand, an image file sent from other image forming apparatus is received, and receiver's digitals signatures for restricting image areas to be presented to a user from among the plurality of image areas are acquired. Then, in accordance with the sender's digital signatures provided respectively to the plurality of image areas included in the received image file and the acquired receiver's digital signatures, image areas to be presented to a user is selected from a plurality of image areas, and the selected image areas are outputted.

Thus, even in the case where a user who receives an image file is permitted to refer to the image file in the future, renewing the receiver's digital signatures makes it possible to easily change image areas to be presented to the user. Accordingly, a convenience for a user can be improved while maintaining a sufficient security.

This application is based on Japanese Patent application serial No. 2007-159160 filed in Japan Patent Office on Jun. 15, 2007, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image transfer system comprising:
an image forming apparatus for forming an image; and
an external equipment communicably connected to the image forming apparatus, wherein
the image forming apparatus includes:
a document reading section for reading a document;
an area extracting section for separating and extracting a plurality of image areas from a document image read by the document reading section;
a digital signature providing section for providing sender's digital signatures respectively to the image areas extracted by the area extracting section in accordance with degrees of secrecy of the image areas;
an image file creating section for creating an image file including a plurality of image areas provided with the sender's digital signatures by the digital signature providing section;
a digital signature creating section for creating a receiver's digital signatures; and
a sending section for sending the image file created by the image file creating section together with the created receiver's digital signatures when the receiver's digital signals are created by the digital signature creating section, and
the external equipment includes:
a receiving section for receiving the image file and the receiver's digital signatures sent by the sending section;
a digital signature acquiring section for acquiring the receiver's digital signatures for restricting image areas to be presented to a user from among the plurality of image areas;
a digital signature storage section for storing the receiver's digital signatures;
an image area selecting section for selecting image areas to be presented to the user from among the plurality of image areas in accordance with the sender's digital signatures provided respectively to the plurality of image areas included in the image file received by the receiving section and the receiver's digital signatures acquired by the digital signature acquiring section; and
an output section for outputting image areas selected by the image area selecting section, and
the digital signature acquiring section acquires the received receiver's digital signatures when the receiving section receives the receiver's digital signatures, and the digital signature acquiring section acquires the receiver's digital signatures stored in the digital signature storage section when the receiving section does not receive the receiver's digital signatures.

2. The image transfer system according to claim 1, wherein the image areas include a character area presenting a character, and a background area other than the character area.

3. The image transfer system according to claim 2, wherein the image forming apparatus further includes:
a setting section for setting the sender's digital signatures in accordance with colors of the background area and colors of the characters in the character area, and
the digital signature providing section provides the sender's signatures associated with colors of the background area and colors of the characters in the character area among the plurality of image areas extracted by the area extracting section.

4. The image transfer system according to claim 1, wherein the receiver's digital signatures include the sender's digital signatures associated with image area which can be presented to a user, and
the image area selecting section selects image areas which are provided with the sender's digital signatures, among the sender's digital signatures provided respectively to the plurality of image areas included in the image file received by the receiving section, matching with the receiver's digital signatures acquired by the digital signature acquiring section.

5. The image transfer system according to claim 1, wherein the image file creating section creates an image file of a file type capable of managing the plurality of image areas individually.

6. The image transfer system according to claim 1, wherein:
the image forming apparatus further includes an encoding processor for encoding the image areas extracted by the area extracting section, and
the digital signature providing section provides sender's digital signatures to the image areas respectively in accordance with degrees of secrecy of the image areas encoded by the encoding processor, and
the external equipment further includes a decoding processor for decoding the image areas selected by the image area selecting section, and
the output section outputs the image areas decoded by the decoding processor.

7. An image transfer system comprising:
an image forming apparatus for forming an image; and
an external equipment communicably connected to the image forming apparatus, wherein
the image forming apparatus includes:
a document reading section for reading a document;
an area extracting section for separating and extracting a plurality of image areas from a document image read by the document reading section;
a digital signature providing section for providing sender's digital signatures respectively to the image areas extracted by the area extracting section in accordance with degrees of secrecy of the image areas;
an image file creating section for creating an image file including a plurality of image areas provided with the sender's digital signatures by the digital signature providing section; and
a sending section for sending the image file created by the image file creating section, and the external equipment includes:
a receiving section for receiving the image file sent by the sending section;
a digital signature acquiring section for acquiring receiver's digital signatures for restricting image areas to be presented to a user from among the plurality of image areas;
an image area selecting section for selecting image areas to be presented to the user from among the plurality of image areas in accordance with the sender's digital signatures provided respectively to the plurality of image areas included in the image file received by the receiving section and the receiver's digital signatures acquired by the digital signature acquiring section; and
an output section for outputting image areas selected by the image area selecting section, and
a digital signature storage section for storing the receiver's digital signature, and
wherein the digital signature acquiring section acquires the receiver's digital signature stored in the digital signature storage section.

8. The image transfer system according to claim 7, wherein the external equipment further includes a receiver's digital signature renewing section for renewing the receiver's digital signal stored in the digital signature storage section.

9. An image forming apparatus comprising:
a document reading section for reading a document;
an area extracting section for separating and extracting a plurality of image areas from a document image read by the document reading section;
a digital signature providing section for providing a sender's digital signatures to each of the image areas extracted by the area extracting section in accordance with respective degree of secrecy of the image areas;
an image file creating section for creating an image file including a plurality of image areas provided with the sender's digital signature by the digital signature providing section;
a digital signature creating section for creating a receiver's digital signatures
a sending section for sending the image file created by the image file creating section together with the created receiver's digital signatures when the receiver's digital signatures are created by the digital signature creating section;
a receiving section for receiving the image file and the receiver's digital signals sent by the sending section;
a digital signature acquiring section for acquiring receiver's digital signatures for restricting image areas to be presented to a user from among the plurality of image areas;
a digital signature storage section for storing the receiver's digital signatures;
an image area selecting section for selecting image areas to be presented to the user from among the plurality of image areas in accordance with the sender's digital signature provided respectively to the plurality of image areas included in the image file received by the receiving section and the receiver's digital signature acquire by the digital signature acquiring section; and
an output section for outputting image areas selected by the image area selecting section, and the digital signature acquiring section acquires the received receiver's digital signatures when the receiving section receives the receiver's digital signatures, and the digital signature acquiring section acquires the receiver's digital signatures stored in the digital signature storage section when the receiving section does not receive the receiver's digital signatures.

10. The image apparatus according to claim 9, wherein the image areas include a character area presenting a character, and a background area other than the character area.

11. The image forming apparatus according to claim 10, wherein the image forming apparatus further includes:
a setting section for setting the sender's digital signatures in accordance with colors of the background area and colors of the characters in the character area, and
the digital signature providing section provides the sender's signatures associated with colors of the background area and colors of the characters in the character area among the plurality of image areas extracted by the area extracting section.

12. The image forming apparatus according to claim 9, further comprising a receiver's digital signature renewing section for renewing the receiver's digital signal stored in the digital signature storage section.

13. The image forming apparatus according to claim 9, wherein the image file creating section creates an image file of a file type capable of managing the plurality of image areas individually.

14. An image forming apparatus comprising:
a document reading section for reading a document;
an area extracting section for separating and extracting a plurality of image areas from a document image read by the document reading section;
a digital signature providing section for providing a sender's digital signatures to each of the image areas extracted by the area extracting section in accordance with respective degree of secrecy of the image areas;
an image file creating section for creating an image file including a plurality of image areas provided with the sender's digital signature by the digital signature providing section;
a sending section for sending the image file created by the image file creating section;
a receiving section for receiving the image file sent by the sending section;
a digital signature acquiring section for acquiring receiver's digital signatures for restricting image areas to be presented to a user from among the plurality of image areas;
an image area selecting section for selecting image areas to be presented to the user from among the plurality of image areas in accordance with the sender's digital signature provided respectively to the plurality of image areas included in the image file received by the receiving section and the receiver's digital signature acquired by the digital signature acquiring section;
an output section for outputting image areas selected by the image area selecting section; and
a digital signature storage section for storing the receiver's digital signature, and
the digital signature acquiring section acquires the receiver's digital signature stored in the digital signature storage section.

* * * * *